(12) United States Patent
Nam et al.

(10) Patent No.: US 12,158,799 B2
(45) Date of Patent: Dec. 3, 2024

(54) DETECTION AND RECOVERY OF DEADLOCKS IN DATABASE MANAGEMENT SYSTEM

(71) Applicant: HYUNDAI AUTOEVER CORP., Seoul (KR)

(72) Inventors: Min Hyeon Nam, Cheonan-si (KR); Min Jun Kim, Cheonan-si (KR); Dong Hyun Park, Iksan-si (KR); Chan Soon Park, Chungju-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 37 days.

(21) Appl. No.: 18/075,870

(22) Filed: Dec. 6, 2022

(65) Prior Publication Data

US 2023/0176943 A1 Jun. 8, 2023

(30) Foreign Application Priority Data

Dec. 7, 2021 (KR) .......................... 10-2021-0173946

(51) Int. Cl.
*G06F 11/00* (2006.01)
*G06F 9/52* (2006.01)
*G06F 11/07* (2006.01)

(52) U.S. Cl.
CPC .......... *G06F 11/0793* (2013.01); *G06F 9/524* (2013.01); *G06F 11/0781* (2013.01)

(58) Field of Classification Search
CPC ............................. G06F 9/524; G06F 11/0793
See application file for complete search history.

(56) References Cited

U.S. PATENT DOCUMENTS

| | | | | |
|---|---|---|---|---|
| 5,377,351 A * | 12/1994 | Kotera | .................... | G06F 9/524 710/200 |
| 6,275,823 B1 * | 8/2001 | Ronstrom | ........... | G06F 16/2343 710/200 |
| 6,807,540 B2 * | 10/2004 | Huras | ................. | G06F 16/2343 719/317 |
| 7,403,945 B2 * | 7/2008 | Lin | .................... | G06F 16/2343 |
| 10,819,777 B1 * | 10/2020 | Nienaber | .............. | H04L 47/803 |
| 11,051,163 B1 * | 6/2021 | Smith | .................. | H04W 12/06 |
| 11,281,654 B2 * | 3/2022 | Antani | ............... | G06F 16/2343 |
| 11,327,955 B1 * | 5/2022 | Holenstein | ......... | G06F 16/2379 |
| 11,599,528 B1 * | 3/2023 | Holenstein | ......... | G06F 16/2379 |
| 11,656,957 B1 * | 5/2023 | Jungfer | ............... | G06F 11/3006 714/3 |
| 2004/0034668 A1 * | 2/2004 | Gotz | .................... | G06F 16/289 |

(Continued)

FOREIGN PATENT DOCUMENTS

| | | |
|---|---|---|
| KR | 20050111885 A | 11/2005 |
| KR | 101132270 B1 | 4/2012 |
| KR | 20150034006 A | 4/2015 |

*Primary Examiner* — Amine Riad (74) *Attorney, Agent, or Firm* — Lempia Summerfield Katz LLC (57) ABSTRACT

A method for detecting a deadlock of a database management system and recovering from the deadlock includes: updating data stored in a first server and a second server; determining whether the database management system is in a deadlock state by comparing data of the first server with data of the second server; and recovering from the deadlock state by changing data of the first server or the second server so that the data of the first server and the second server are identical.

13 Claims, 6 Drawing Sheets

(56) References Cited

U.S. PATENT DOCUMENTS

| | | | |
|---|---|---|---|
| 2006/0101081 A1* | 5/2006 | Lin | G06F 16/2343 |
| 2009/0106326 A1* | 4/2009 | Antani | G06F 16/2343 |
| 2013/0290295 A1* | 10/2013 | Soules | G06F 16/21 |
| | | | 707/E17.032 |
| 2018/0046565 A1* | 2/2018 | Lu | G06F 11/3636 |
| 2018/0173744 A1* | 6/2018 | Barbas | G06F 16/2365 |
| 2019/0163559 A1* | 5/2019 | Takahashi | G06F 11/0793 |
| 2019/0213271 A1* | 7/2019 | Musku | G06F 16/2358 |

* cited by examiner

DETECTION AND RECOVERY OF DEADLOCKS IN DATABASE MANAGEMENT SYSTEM

CROSS REFERENCE TO RELATED APPLICATION

This application claims priority to Republic of Korea Patent Application No. 10-2021-0173946 filed on Dec. 7, 2021, which is hereby incorporated by reference in its entirety.

BACKGROUND

1. Field of Technology

The present disclosure relates to a method for detecting a deadlock of a database and recovering from the deadlock. More specifically, the present disclosure relates to a method and system for monitoring a deadlock of a database in real-time and quickly recovering from a failure of a database management system.

2. Related Technology

Data stored in a database may be implemented so that data are read, written, updated, and deleted by sessions performed sequentially or simultaneously.

A database management system (DBMS) is a system that manages a database capable of structuring, storing, and managing data.

Session operations in the database may be performed abnormally, and responses may be delayed or stopped, which may be defined as a deadlock.

In the deadlock of a database, functions for all users, programs, or equipment connected to the DBMS are restricted (e.g., it is impossible to query the database or input and delete data to and from the database) and due to this phenomenon, the entire system (e.g., the web or application) may stop operating.

In a Manufacturing Execution System (MES) for a product, since various types of data such as work schedules of production sites, product information, and production records are created and managed in a database, a failure in the database is closely related to the efficiency of production and management of products.

If a database stores and manages the data of production facilities for a product, a delay or failure of the database may cause a severe failure, making the production facilities become inoperable or stopping the production line.

The discussions in this section are only to provide background information and do not constitute an admission of prior art.

SUMMARY

Based on the background above, according to one aspect of the present disclosure, an object of the present embodiment is to provide a method and system for detecting a deadlock occurring in a database management system (DBMS) and recovering from the deadlock.

In another aspect, an object of the present disclosure is to provide a method and system for summarizing data generated during a recovery process from a deadlock occurring in a DBMS as log files, analyzing the log files, and improving the speed and performance of recovery from a repeatedly occurring deadlock.

In another aspect, an object of the present disclosure is to provide a method and system for determining and classifying severity of a plurality of deadlocks occurring in a DBMS and optimally utilizing limited resources by recovering from the deadlocks in order of priority.

In another aspect, an object of the present disclosure is to provide a method and system for enhancing the security of a database by adding an administrator authentication step in the process of resolving a deadlock occurring in a DBMS.

To achieve the objects above, one embodiment of the present disclosure may provide a method for detecting a deadlock of a DBMS and recovering from the deadlock. In particular, the method comprises: updating data stored in a first server and a second server; determining whether the DBMS is in a deadlock state by comparing data of the first server with data of the second server; and recovering from the deadlock state by changing data of the first server or the second server so that the data of the first server and the second server are identical.

In determining a deadlock of a DBMS and recovering from the deadlock, each of the first and second servers includes at least one or more sessions in which a connection between a client and a server is maintained, and operations of the at least one or more sessions of the first and second servers are stopped in the deadlock state.

In a method for detecting a deadlock of a DBMS and recovering from the deadlock, the deadlock state includes monitoring data stored in the first and second servers through a control server communicating with the first and second servers.

In a method for detecting a deadlock of a DBMS and recovering from the deadlock, the deadlock recovering may include stopping a session of the first server and resuming the session of the first server after changing data of the first and second servers to be identical.

In a method for detecting a deadlock of a DBMS and recovering from the deadlock, the method may further include classifying servers in the deadlock state in order of deadlock occurrence time and determining the order of priority of the deadlock state.

In a method for detecting a deadlock of a DBMS and recovering from the deadlock, the method may further comprise transmitting an alarm information on the deadlock state to an administrator terminal when the deadlock state of the database management system is determined.

In a method for detecting a deadlock of a DBMS and recovering from the deadlock, the method may further comprise authenticating an administrator authenticating right of a user accessing a system through a link transmitted to the administrator terminal.

To achieve the objects above, another embodiment of the present disclosure may provide a system for detecting a deadlock of a DBMS and recovering from the deadlock. The system may comprise a control server configured to monitor data of a server of a Database Management System (DBMS) and determine whether a deadlock has occurred in the DBMS and a communication server configured to transmit a message to an administrator terminal when the control server determines that the DBMS is in a deadlock state, wherein the communication server is configured to resolve the deadlock of the DBMS by transmitting a command from an administrator to the control server.

In a system for detecting a deadlock of a DBMS and recovering from the deadlock, the deadlock of the DBMS may be defined as a state in which data inquiry in a database is delayed due to an operation time delay in a part of sequentially connected sessions.

In a system for detecting a deadlock of a DBMS and recovering from the deadlock, the control server is configured to remotely access the server of the DBMS and perform one or more of inquiring, inputting, and deleting data within the database management system.

In a system for detecting a deadlock of a DBMS and recovering from the deadlock, the control server further includes a log server configured to store information on whether the DBMS is in a deadlock state as a log file.

In a system for detecting a deadlock of a DBMS and recovering from the deadlock, the communication server is configured to receive a response signal of a message transmitted to the administrator terminal and transmit the received response signal to the control server, and the control server is configured to execute the command only when the response signal satisfies a preconfigured criterion.

In a system for detecting a deadlock of a DBMS and recovering from the deadlock, the control server is configured to determine a database to which the command is to be transmitted based on an input signal of the administrator.

In a system for detecting a deadlock of a DBMS and recovering from the deadlock, the input signal of the administrator is configured to be generated when an image area of a database for which a deadlock is to be resolved is clicked or touched.

In a system for detecting a deadlock of a DBMS and recovering from the deadlock, the control server is configured to arrange databases in a deadlock state according to a preconfigured criterion and transmit information on an arrangement priority to the administrator terminal through the communication server.

As described above, according to one embodiment of the present disclosure, a deadlock of a database may be detected promptly and resolved through real-time monitoring of the database.

Also, according to one embodiment of the present disclosure, time delay and instability problems in a DBMS failure recovery process caused when an administrator manually detects and resolves a database deadlock may be resolved, and a situation in which production facilities become inoperable or a production line is stopped may be prevented in advance.

Also, according to one embodiment of the present disclosure, data generated during a recovery process from a deadlock in a DBMS may be summarized as log files, the log files may be analyzed, and the speed and performance of recovery from a repeatedly occurring deadlock may be improved.

Also, according to one embodiment of the present disclosure, the severity level of a plurality of deadlocks may be determined and classified, limited resources may be optimally utilized by recovering from the deadlocks in order of priority, and time required for managing a database may be reduced since a specific database required is managed selectively.

Also, according to one embodiment of the present disclosure, the security of a database may be enhanced by adding an administrator authentication step in the process of resolving a deadlock.

DETAILED DESCRIPTION OF EMBODIMENTS

In the following, several embodiments are described in detail with reference to illustrative drawings. In assigning reference symbols to the constituting elements of each drawing, it should be noted that the same constituting elements are intended to have the same symbol as much as possible, even if they are shown on different drawings. Also, in describing the present disclosure, if it is determined that a detailed description of a related well-known configuration or function incorporated herein unnecessarily obscure the gist of the present disclosure, the detailed description thereof is omitted.

Also, in describing the constituting elements of the present disclosure, terms such as "first," "second," "a," and "b" may be used. Such terms are intended only to distinguish one constituting element from the others and do not limit the nature, sequence, or order of the constituting element. If a constituting element is said to be "linked to," "combined with," or "connected to" a different constituting element, it should be understood that the constituting element is linked or connected to the different constituting element, but another constituting element may be "linked," "combined," or "connected" between the two constituting elements.

Also, the term "system" or "server" may be defined as, but not limited to, a computer program or a device that transmits and receives information to and from a client through a network for storage and management of data.

Figure 1:
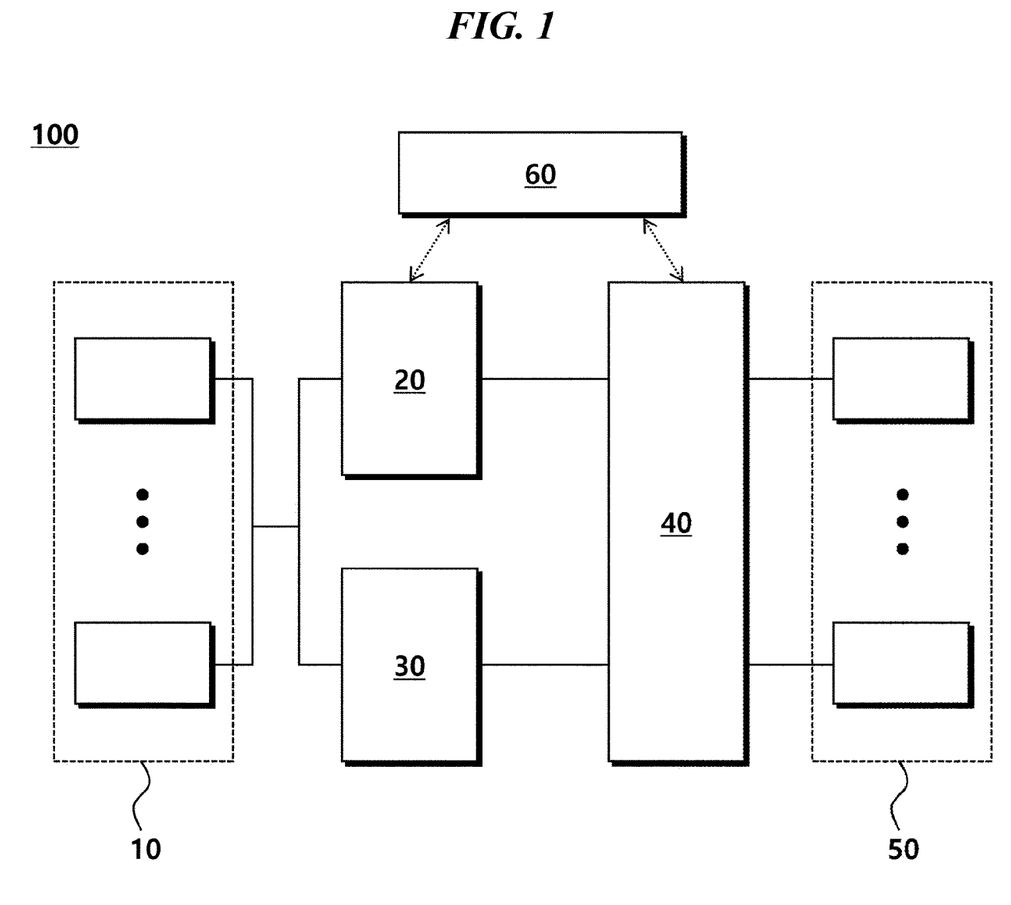
FIG. 1 illustrates a structural diagram of a database management system according to one embodiment of the present disclosure.

FIG. 1 illustrates a structural diagram of a database management system according to one embodiment of the present disclosure.

Referring to FIG. 1, the database management system 100 includes: an administrator terminal 10; a communication server 20; an authentication server 30; a control server 40; a database server 50; and a cloud server 60.

The deadlock of the database management system 100 may be defined as a deadlock occurring in the database server 50, and the structure of each server and the system may be physically or conceptually distinguished from each other.

The administrator terminal 10 may receive a message or an alarm through the communication server 20 and transmit a command for resolving the deadlock to the control server 40. The administrator terminal 10 may be implemented using an arbitrary device such as a computer, a mobile device, or a server, as long as a database administrator may manage the database of a system using the device through the web or an application.

A user using the administrator terminal 10 may further perform a step of authenticating the database access right through the authentication server 30.

The administrator terminal 10 may be a device for the administrator to check the status of the database and deliver commands but may be implemented as a part of functions in the system not requiring user intervention according to the configuration of the database management system (DBMS), which precludes using a physical device.

The communication server 20 may be a server that transmits an alarm to the administrator terminal 10 or transmits and receives commands to and from the administrator terminal 10.

The authentication server 30 may be a server that performs a user authentication procedure in a process where the administrator terminal 10 processes a command through the control server 40. The authentication server 30 may perform the user authentication procedure before executing command processing and determine whether to execute the command according to the user's database access right.

The control server 40 may be a server capable of accessing the database server 50 to read, write, update, or delete data in the database.

The control server 40 may be remotely connected to the database server 50 and resolve a deadlock of the database server 50 by executing commands received from the administrator terminal 10.

The database server 50 may be a server including a database to be monitored, and the database to be monitored may be registered in advance to define a management target.

The database server 50 may be a server including a set of a plurality of databases and servers, such as a first server for storing a first database and a second server for storing a second database.

When the database server 50 is managed by being divided into several databases and sessions, it is possible to prevent a phenomenon in which the entire database is stopped due to a single deadlock. Also, when a deadlock is detected and resolved by dividing the database server 50 into a plurality of databases and sessions, the priority order of deadlock resolution may be defined according to the internal resource status to make more efficient decision-making possible.

The cloud server 60 may be a server configured to manage servers 20, 30, 40 in a virtual environment in the form of an image to be distributed to any server if necessary.

The operation of sessions in the database may not be performed normally, and responses may be delayed or stopped, which may be defined as a deadlock. A session may be defined as a series of operations such as data read, write, update, and delete performed after the database is accessed until the access is terminated and may be stored in the server for each client.

For example, since all or part of functions such as query, read, write, update, and delete of tables become impossible when the database is in a deadlock state and locked, it is highly likely to cause errors in the operation of production facilities or production line operating using the corresponding database.

Through real-time monitoring of the database according to an embodiment of the present disclosure, a deadlock of a database may be detected immediately and resolved.

Figure 2:
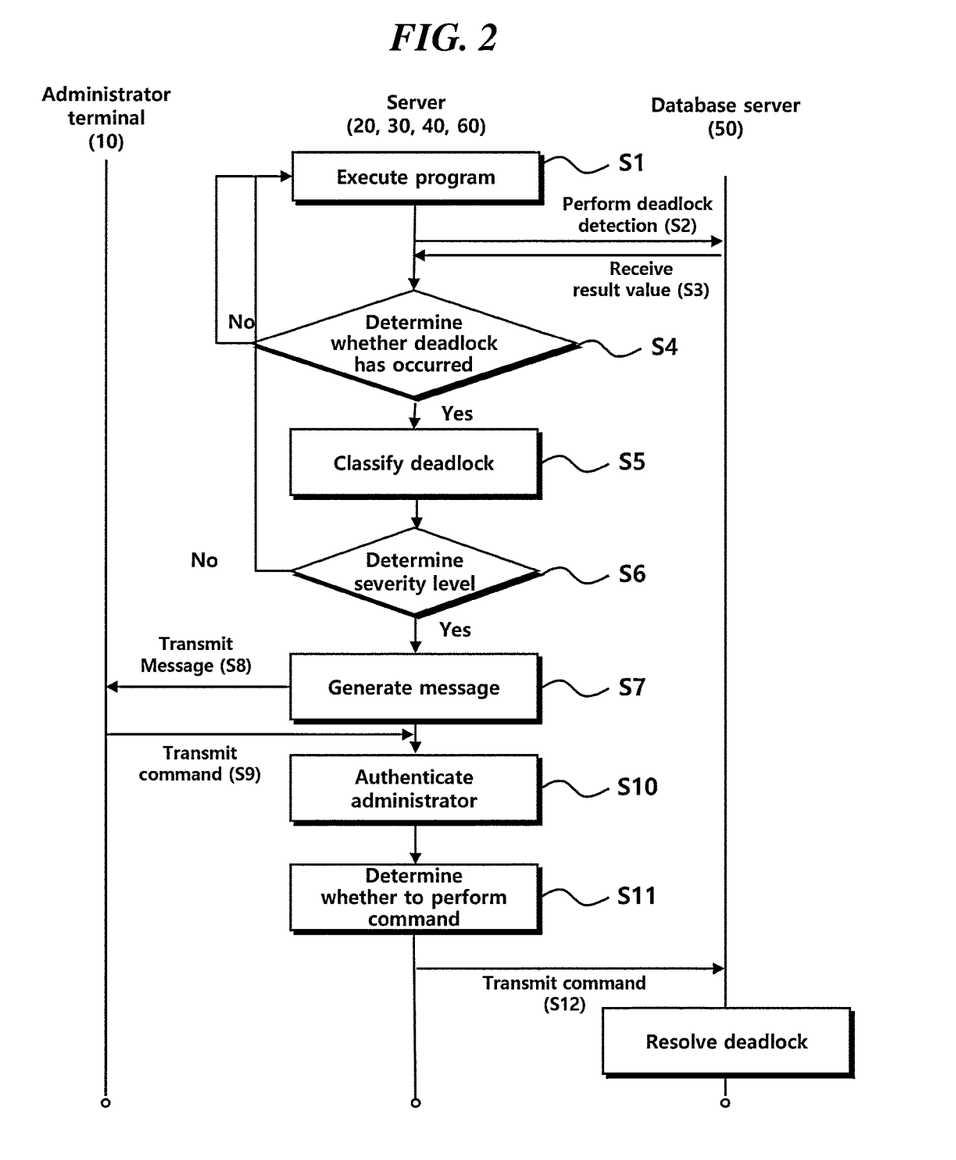
FIG. 2 is a flow diagram illustrating a method for detecting a deadlock of a database management system and recovering from the deadlock according to one embodiment of the present disclosure.

FIG. 2 is a flow diagram illustrating a method for detecting a deadlock of a database management system and recovering from the deadlock according to one embodiment of the present disclosure.

Referring to FIG. 2, a method for detecting a deadlock of a database management system and recovering from the deadlock may comprise: executing a program that starts the operation of a server S1; performing detection of a deadlock of a database server S2; receiving a result value of the database server S3; determining whether the database server is in a deadlock state S4; classifying the deadlock of the database server S5; determining the severity level of the deadlock of the database server S6; generating a message S7; transmitting the message S8; transmitting a command to a control server S9; authenticating administrator rights S10; determining whether to execute commands S11; and transmitting commands to the database server S12.

A method for detecting a deadlock of a database management system and recovering from the deadlock according to one embodiment of the present disclosure may include all or part of the steps described above S1 to S12, and the order of executing the steps may be changed depending on the needs.

The executing a program that starts the operation of a server S1 may start or continue the operation of servers 20, 30, 40, 60 of the database management system.

The performing detection of a deadlock of a database server S2 may be a step in which the control server 60 connects to the database of the database server 50 and monitors the data status or detects changes in the data.

The control server 60 may remotely access the database server 50 to monitor data in real-time.

When the database server 50 includes a plurality of servers, such as a first server and a second server, the control server 60 may detect a change or update of data in each server.

The receiving a result value of the database server S3 may be a step in which the control server 60 receives the result value of detecting the data change of the database server 50.

The control server 60 may receive raw data to determine whether the database is normal or abnormal or may receive information on whether the database is normal or abnormal from the database server 50.

All or part of the process of the performing detection of a deadlock of a database server S2 and the receiving a result value of the database server S3 described above may be defined as deadlock monitoring of the database, where data may be transmitted and received between the control server 60 and the communication server 20 in each step.

The determining whether the database server is in a deadlock state S4 may determine whether the database server 50 is in a deadlock state based on a change in the data stored in the database server 50 or a response time.

For example, the control server 60 may determine whether the database server 50 is in a deadlock state by monitoring and comparing the data of the first and second servers. When the data of the first and second servers are different, it may be determined that the database is in a deadlock state, but the present disclosure is not limited to this specific example.

When each of the first and second servers of the database server 50 includes one or more sessions in which a connection between a client and a server is maintained. The deadlock of the database server 50 may be defined as a state in which sessions of the first and second servers are stopped, or session responses are delayed.

If it is determined that the database server 50 is not in a deadlock, the method returns to the step of monitoring the database server 50.

The classifying the deadlock of the database server S5 may classify the data obtained by the control server 60 for the purpose of statistical analysis; if necessary, data related to determining a deadlock of the database server may be classified according to the binary number system comprising 0 and 1, but the present disclosure is not limited to the specific example.

The determining the severity level of the deadlock of the database server S6 may determine the severity level of the deadlock of the database server 50.

The severity level may be defined in various ways depending on the type and state of a database. For example, the severity level may be defined as, but not limited to: a deadlock occurrence time; a response delay time; an upper database; or the number of lower-level sessions and indicators based on various criteria may be used to determine the severity level.

When the severity level is quantified in terms of a grade according to a preconfigured criterion, the priority of a deadlock may be determined.

If it is determined that the severity level of the database server 50 is low (e.g., a grade below a preconfigured threshold is determined to be in a normal state) the method returns to the step of monitoring the database server 50.

The generating a message S7 may be a step in which the control server 60 generates an alarm or a message. The information included in the alarm or message may include: information on a system name; a server IP address; a DB name; a table name; a process ID; a delay time; and structured data query language (SQL) for specific execution.

Also, the alarm or message may include a web access link. If necessary, the alarm or message may be implemented so that all or part of the information above may be checked on the accessed web page.

The transmitting the message S8 may be a step of transmitting the alarm or message generated by the control server 60 to the administrator terminal 10 through the communication server 20.

The administrator may comprise a plurality of managers in charge. All or some of the managers receiving the message may perform a deadlock resolution process.

The transmitting a command to the control server S9 may be a step of transmitting a command for resolving the deadlock of the database server 50 to the control server 60.

The command may be related to, but is not limited to, the session-kill of the database, but various other commands may be used.

A session identification (ID) and a serial number may be assigned to the database session of the database server 50, and the command above may be transmitted by specifying a session determined to be in a deadlock.

The authenticating administrator rights S10 may be a step of determining whether a user has the right to access the database management system (DBMS) and determining the user who passes the authentication as an administrator.

Since a user accessing the database server 50 may access and manipulate data, it is possible to enhance database stability and security through an administrator authentication function. For example, the authenticating administrator rights S10 may be performed through the authentication server 30 or the cloud server 60.

The determining whether to execute commands S11 may be a step of determining whether to transmit the command received from the administrator terminal 10 to the database server 50.

The control server 60 may decide to transmit commands received from the administrator terminal 10 when it is determined that the user who has accessed the database through the administrator authentication function is an administrator having database access rights.

The transmitting commands to the database server S12 may be a step in which, when a decision is made so that the control server 60 transmits commands to the database server 50, the corresponding commands are remotely transmitted to the database server 50.

The database and table of the database server 50 that has received the commands (e.g., a server in a deadlock) may be resolved from the deadlock and may be converted to a recovery mode.

For example, the first and second servers of the database server 50 may perform a recovery mode that resolves the deadlock of the database server 50 by making the data of the first and second servers identical according to the command.

The recovery mode for resolving the deadlock of the database server 50 may stop a session of the first server and restart the session of the first server after changing the data of the first server to be the same as the data of the second server.

By using the method above, the recovery time required from the initial time point when a database failure occurs to the time the database recovers from the failure may be reduced.

Through sequential processing of real-time detection, statistics, analysis, notification, authentication, and recovery of the database server 50 in which a deadlock has occurred, it is possible to reduce recovery time from a failure and implement database security simultaneously.

Figure 3:
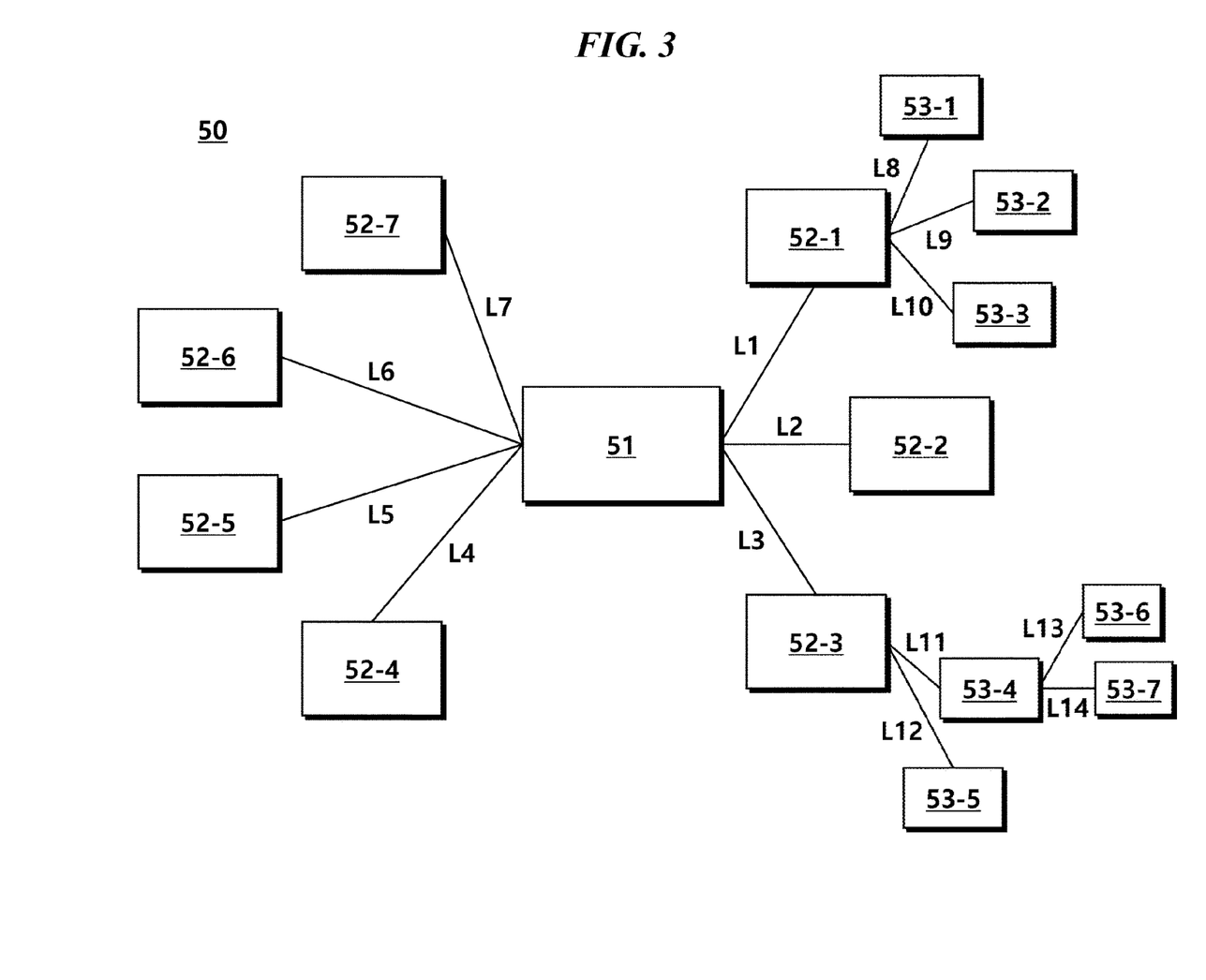
FIG. 3 visualizes a connection relationship of databases according to one embodiment of the present disclosure.

FIG. 3 visualizes a connection relationship of databases according to one embodiment of the present disclosure.

Referring to FIG. 3, the database server 50 according to one embodiment of the present disclosure may visualize the information on a database connection relationship and sessions.

For example, the database included in the database server 50 may be divided into: a main database 51; a first database 52-1; a second database 52-2; a third database 52-3; a fourth database 52-4; a fifth database 52-5; a sixth database 52-6; and a seventh database 52-7.

The main database 51 may be defined as a set of all databases, and the main database 51 and the first to seventh databases 52 to 57 may have a hierarchical relationship. In other words, the main database 51 may include the first to seventh databases 52 to 57. The databases may or may not have a session.

For example, the first database 52-1 may include: a first session 53-1; a second session 53-2; and a third session 53-3; and the third database 52-3 may include: a fourth session 53-4; a fifth session 53-5; a sixth session 53-6; and a seventh session 53-7. The fifth session 53-5, the sixth session 53-6, and the seventh session 53-7 may have a hierarchical relationship.

Since the hierarchical relationship may describe a relationship defined in order of operation time, the session operation in the third database 52-3 is performed in the order of the fourth session 53-4, the sixth session 53-6, and the seventh session 53-7. Therefore, since the operations of the sixth session 53-6 and the seventh session 53-7 are not performed due to the deadlock of the fourth session 53-4, it is necessary to resolve the deadlock of a session in the upper hierarchy.

Also, lines L1 to L14 may be used to indicate a connection relationship between each database and session.

In FIG. 3, defined as a dashboard, an administrator may intuitively check the operation sequence and status of each database and session through the terminal display.

Figure 4:
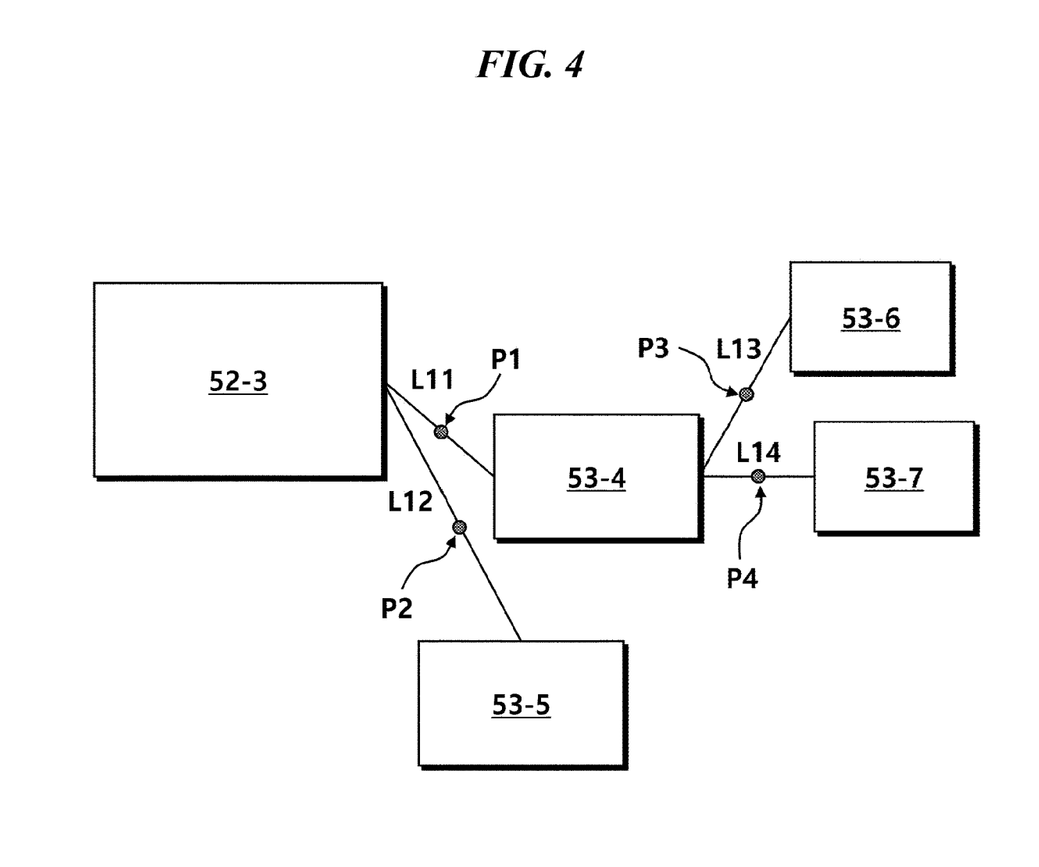
FIG. 4 is an enlarged view of a portion of the structural diagram of FIG. 3.

FIG. 4 is an enlarged view of a portion of the structural diagram of FIG. 3.

Referring to FIG. 4, a deadlock of each database or session may be checked through a line connecting a database and a session or connecting sessions.

For example, images P1, P2, P3, P4 by which to check intuitively whether a database or a session is in a deadlock state may be displayed in a circular shape on the 11$^{th}$ to 14$^{th}$ lines displayed on the administrator terminal; a click or a touch of each image may resolve the deadlock of the database or session.

In other words, based on a signal generated by clicking or touching the image area P1, P2, P3, P4 displayed on the administrator terminal, a session-kill command for resolving the deadlock of the database or session may be delivered immediately.

According to another embodiment, a step of popping up information on the deadlock of the database or session through clicking or touching each image may be further performed; a command selected by the administrator according to the type of deadlock may be transmitted separately.

Figure 5:
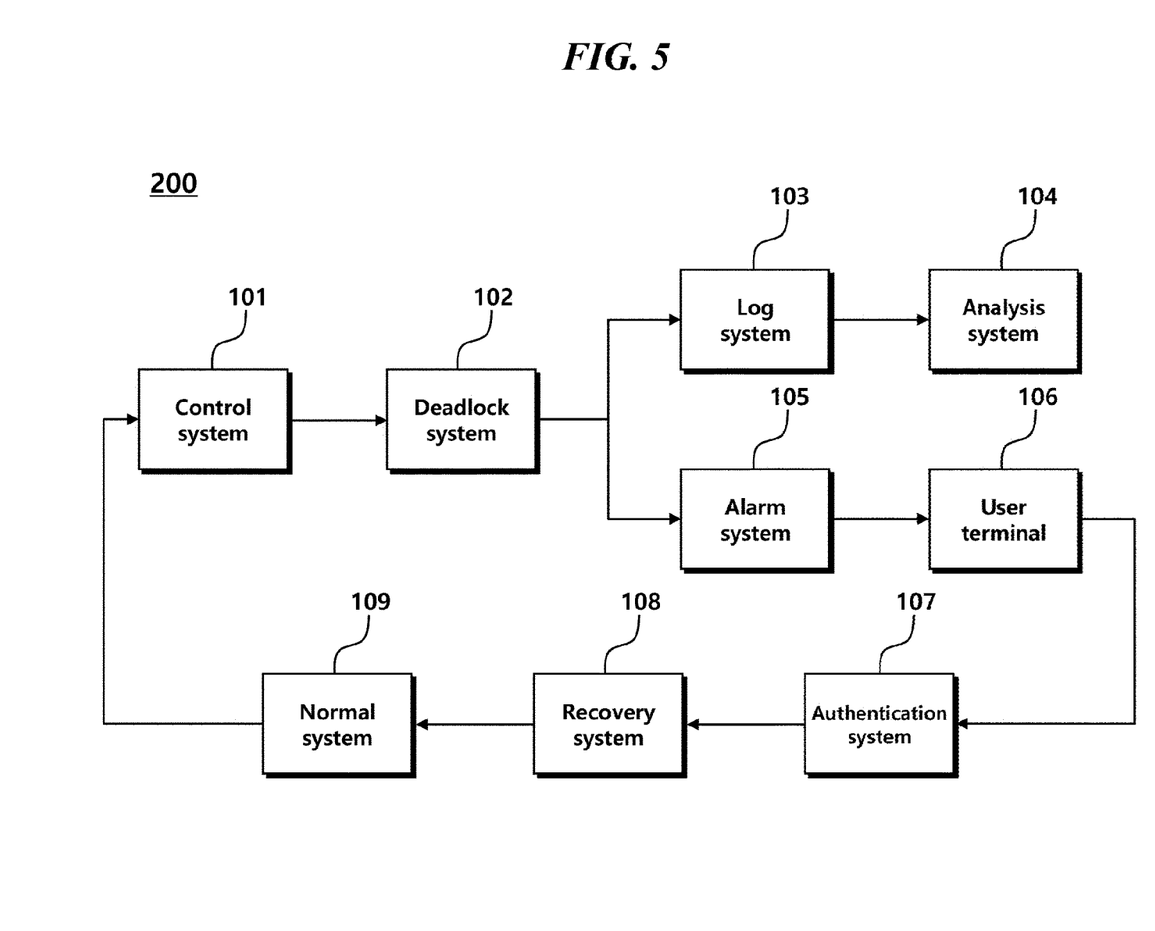
FIG. 5 is a block diagram illustrating an operating process of a system for detecting a deadlock of a database and recovering from the deadlock according to another embodiment of the present disclosure.

FIG. 5 is a block diagram illustrating an operating process of a system for detecting a deadlock of a database and recovering from the deadlock according to another embodiment of the present disclosure.

Referring to FIG. 5, a system for detecting a deadlock of a database and recovering from the deadlock 200 may comprise: a control system 101; a deadlock system 102; a log system 103; an analysis system 104; an alarm system 105; a user terminal 106; an authentication system 107; a recovery system 108; and a normal system 109.

Each system defined in the system for detecting a deadlock of a database and recovering from the deadlock may be understood as a device or program that performs an information processing function, such as a server. Each system may be understood as including a database or a session if necessary.

The control system 101 may observe the state of a system in real-time, detect a deadlock of a database or a session within the system, and perform recovery from the deadlock.

The control system 101 may include a control server (not shown) that monitors data of a server of a database management system (DBMS) and determines whether the DBMS is in a deadlock state.

The control server (not shown) may remotely access the server of the DBMS to perform at least one of inquiry, input, and deletion of data in the database.

The deadlock system 102 refers to one or more systems in which a deadlock has occurred and may be distinguished from a system in a normal state.

The deadlock of the database management system may be defined as a state in which data inquiry within the database is delayed or stopped due to an operation time delay in a portion of sequentially connected sessions.

For example, when the operation time delay is 10 minutes or more, the control system 101 may determine that the database is deadlocked and may further determine the deadlock severity.

The log system 103 may be a system that generates a history of the occurrences of deadlock detected by the control system 101, the time of occurrences, and so on as a log file. The log file may be defined as one type of data in the database server depending on the needs, and the control server (not shown) may include a log server (not shown) that stores information on whether the database management system is deadlocked as a log file.

Since the log system 103 may store and manage the deadlock history of the database, the log file may improve the accuracy and speed of subsequent processing of the deadlock.

The analysis system 104 may be a system that prevents a system failure based on the information generated by the log system 103 and analyzes and manages follow-up measures as statistical data.

The alarm system 105 may be a system that provides information on a deadlock occurring in the deadlock system 102 to the administrator terminal 10 in the form of a mobile alarm.

The alarm system 105 may include a communication server (not shown) that transmits a message to the administrator terminal when the control server (not shown) determines that the database management system is deadlocked.

The user terminal 106 may be a mobile device, such as a smartphone, that may receive information provided in the form of a mobile alarm, transmit the information to the administrator, and check the information.

In the user terminal 106, administrator authentication may be processed through a mobile authentication means (e.g., FIDO (fast identity online) administrator authentication) and a command for resolving a deadlock may be transmitted through the communication server (not shown) to the control server (not shown).

The control server (not shown) may execute a command by transmitting the command to the database server only when a response signal meets a preconfigured criterion (e.g., when the user clicks or touches an image area, or the user passes the mobile authentication).

Also, the control server (not shown) may determine the database to which the command is to be transmitted based on an input signal of the administrator, arrange databases in the deadlock according to a preconfigure criterion, and transmit information on the order of arrangement through the communication server (not shown) to the user terminal 106.

The authentication system 107 may be a cloud server capable of administrator authentication processing (FIDO Authentication) in the user terminal 106.

The recovery system 108 may be a system capable of verifying whether the command transmitted from the user terminal 106 may be processed and resolving the deadlock of the database or session through the recovery mode. The recovery system 108 may be the control server described above.

The normal system 109 may be a system that has turned into a normal state from a deadlock by applying a command received by the recovery system 108.

As in the flow diagram described above, inoperability of production facilities and stopping of a production line may occur due to an operational delay or a failure of a database. Inoperability of production facilities and stopping of a production line may be effectively prevented by performing the whole lifecycle process comprising: detection of a deadlock of a system; acquisition and analysis of statistical data; notification and authentication of an administrator; and recovery from the deadlock.

Figure 6:
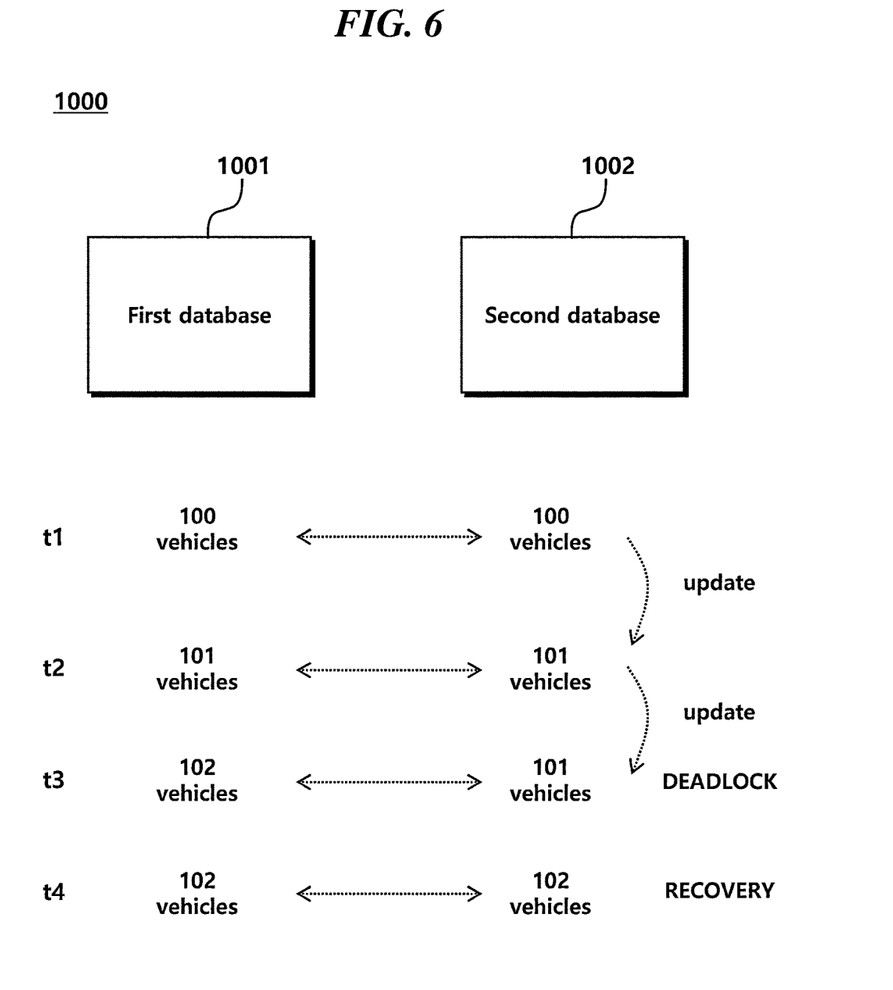
FIG. 6 illustrates a process in which data is updated and a deadlock is generated in a database.

FIG. 6 illustrates a process in which data is updated and a deadlock is generated in a database.

Referring to FIG. 6, data update and deadlock generation processes in various databases may be compared in an illustrative manner.

The database 1000 may include a first database 1001 and a second database 1002, and the data stored in each database may change over time.

For example, when the data stored in each database 1001, 1002 relates to the performance of vehicle production (e.g., the number of vehicles produced), the number of produced vehicles stored in the database may change according to sequential changes in time Data update of each database 1001, 1002 may be performed at the same time but may be performed at a different time from the others depending on the situations of the database.

Data stored in the first database 1001 and the second database 1002 at a first time t1 may be the same as 100 vehicles.

At a second time t2, data stored in the first database 1001 and the second database 1002 may be updated as 101 vehicles.

At a third time t3, the data stored in the first database 1001 is updated as 102 vehicles, but the data stored in the second database 1002 may be kept to 101 vehicles. A deadlock in the database may occur due to the difference between the data.

To resolve the deadlock in the database, the data stored in the databases 1001, 1002 may be maintained by stopping sessions and forcibly updating the data of the second database 1002 that has not been updated. The process above may stop and resume sessions through a command stored in the server, or a command transmitted from the administrator terminal.

Data update in the database has been described through one data for the convenience of explanation; however, a plurality of deadlock situations may occur even within one database due to aggregation of multiple data in a table or the like.

In a plurality of deadlock situations, recovery from deadlock may be performed by setting a high priority to a session preceding in terms of operation time among sequentially connected sessions and putting a low priority to a subsequent session in terms of operation time. The severity determination process described above may be further performed during this process.

At a fourth time t4, since the data stored in the first database 1001 and the second database 1002 are the same as 102 vehicles, the deadlock is recovered to a normal state, and sessions may operate in a normal manner.

What is claimed is:

1. A method for detecting a deadlock of a database management system and recovering from the deadlock, the method comprising:
updating same data fields of databases respectively managed by a first server and a second server;
determining whether the database management system is in a deadlock state by comparing pieces of data of the same data fields respectively managed by the first server and the second server, including determining that the database management system is in the deadlock state when the pieces of data are different; and
recovering from the deadlock state, including:
stopping a session of the first server,
resolving the deadlock by changing data of the first server or the second server so that the data of the first server and the second server are identical, and
resuming the session of the first server.

2. The method of claim 1, wherein determining whether the database management system is in the deadlock state includes: monitoring data stored in the first and second servers through a control server communicating with the first and second servers.

3. The method of claim 1, further comprising: classifying servers in the deadlock state in order of deadlock occurrence time; and determining the order of priority of the deadlock state.

4. The method of claim 1, further comprising: transmitting an alarm information on the deadlock state to an administrator terminal when the deadlock state of the database management system is determined.

5. The method of claim 4, further comprising: authenticating an administrator authenticating right of a user accessing a system through a link transmitted to the administrator terminal.

6. A system for detecting a deadlock of a database management system and recovering from the deadlock, the system comprising:
a control server configured to monitor data of same data fields in multiple servers of a Database Management System (DBMS) and determine whether a deadlock has occurred in the database management system based on whether the data of the same data fields in the multiple servers is different; and
a communication server configured to transmit a message to an administrator terminal when the control server determines that the database management system is in a deadlock state,
wherein the communication server is configured to resolve the deadlock of the database management system by transmitting a command from an administrator to the control server.

7. The system of claim 6, wherein the deadlock of the database management system is defined as a state in which data inquiry in a database is delayed due to an operation time delay in a part of sequentially connected sessions.

8. The system of claim 6, wherein the control server is configured to remotely access each server of the database management system and perform one or more of inquiring, inputting, and deleting data within the database management system.

9. The system of claim 6, wherein the control server further includes a log server configured to store information on whether the database management system is in a deadlock state as a log file.

10. The system of claim 6, wherein the communication server is configured to receive a response signal of a message transmitted to the administrator terminal and transmit the received response signal to the control server, and
the control server is configured to execute the command only when the response signal satisfies a preconfigured criterion.

11. The system of claim 6, wherein the control server is configured to determine a database to which the command is to be transmitted based on an input signal of the administrator.

12. The system of claim 11, wherein the input signal of the administrator is configured to be generated when an image area of a database for which a deadlock is to be resolved is clicked or touched.

13. The system of claim 6, wherein the control server is configured to arrange databases in a deadlock state according to a preconfigured criterion and transmit information on an arrangement priority to the administrator terminal through the communication server.

* * * * *